United States Patent
Justin

(10) Patent No.: US 9,797,285 B2
(45) Date of Patent: Oct. 24, 2017

(54) UNIDIRECTIONAL FLOW DIESEL PARTICULATE FILTER

(71) Applicant: Caterpillar Inc., Peoria, IL (US)

(72) Inventor: Julian Justin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 200 days.

(21) Appl. No.: 14/739,704

(22) Filed: Jun. 15, 2015

(65) Prior Publication Data

US 2016/0363020 A1 Dec. 15, 2016

(51) Int. Cl.
*F01N 3/021* (2006.01)
*B01D 46/00* (2006.01)

(52) U.S. Cl.
CPC .......... *F01N 3/0211* (2013.01); *B01D 46/002* (2013.01); *B01D 46/0005* (2013.01); *B01D 46/008* (2013.01); *B01D 2279/30* (2013.01)

(58) Field of Classification Search
CPC ............. B01D 46/0005; B01D 46/002; B01D 46/008; B01D 2279/30; F01N 3/0211
See application file for complete search history.

(56) References Cited

U.S. PATENT DOCUMENTS

| 7,779,624 | B2 | 8/2010 | Belisle et al. | |
| 9,010,096 | B2* | 4/2015 | Golin | F01N 3/021 |
| | | | | 60/274 |
| 2011/0167807 | A1* | 7/2011 | Mitsuda | F01N 3/0211 |
| | | | | 60/311 |
| 2014/0041369 | A1 | 2/2014 | Golin et al. | |
| 2015/0240681 | A1* | 8/2015 | Fritz | F01N 3/031 |
| | | | | 60/274 |

* cited by examiner

*Primary Examiner* — Robert Clemente
(74) *Attorney, Agent, or Firm* — Miller, Matthias & Hull LLP

(57) ABSTRACT

A diesel particulate filter (DPF) canister for an exhaust gas aftertreatment module is disclosed. The DPF canister may include a canister housing having an inlet flange and an outlet flange attached at opposite ends, and a canister sealing flange installed there between. The outlet flange may have a greater outer diameter than the inlet flange, and the canister sealing flange may have a greater outer diameter than the inlet and outlet flanges. A DPF receptacle may include a cylindrical receptacle housing with a receptacle sealing flange attached at one end and having a receptacle sealing flange inner diameter that is greater than the outer diameter of the inlet flange, but less than the outer diameters of the outlet flange and the canister sealing flange so that the DPF canister can only be installed with the inlet flange inserted through the receptacle sealing flange.

19 Claims, 6 Drawing Sheets

UNIDIRECTIONAL FLOW DIESEL PARTICULATE FILTER

TECHNICAL FIELD

The present disclosure relates generally to exhaust gas aftertreatment systems and, more particularly, to diesel particulate filter (DPF) canisters configured for proper orientation during installation in an exhaust gas aftertreatment module.

BACKGROUND

Power systems such as large internal combustion engines, for example, burn hydrocarbon-based fuels or similar fuel sources to convert the chemical energy therein to mechanical energy for powering an associated machine or application. Combustion of the hydrocarbon fuel may release or create several byproducts or emissions, such as nitrogen oxides ($NO_x$), carbon monoxides and carbon dioxides (CO and $CO_2$), and particulate matter. The quantity of some of these emissions that may be released to the environment may be subject to government regulations and environmental laws. Accordingly, manufacturers of such power systems may equip the system with an associated exhaust gas aftertreatment system to treat the emissions before they are discharged to the environment.

The exhaust gas aftertreatment system can be disposed in the exhaust channel of the power system and may include one or more of a diesel oxidation catalyst (DOC) unit, a DPF unit, and an $NO_x$ reducing device through which the exhaust gasses may pass. The module may include one or more DPF canisters that can filter out most or all of the particulate matter in a diesel engine exhaust stream. The DPF canisters contain an appropriate filtering material, such as wall flow filter arrangements, ceramic fiber filters, metal fiber filters, paper, partial filters and the like. The diesel exhaust stream enters through an inlet side of the aftertreatment module and the DPF canisters. Particulate matter in the diesel exhaust stream is caught by the filtering material, and filtered exhaust gas exits through an outlet side of the module and DPF canisters. The filtered exhaust gas is discharged to the atmosphere or passes through additional $NO_x$ treatment components before being discharged.

Over time, the particulate material builds up and increases the pressure required to force the exhaust gas through the filtering material in the DPF canisters. The buildup can ultimately cause engine performance issues. In some implementations, the accumulated particulate material, or soot, may be combusted and converted to ash by a regeneration process while the DPF canisters remain installed. However, the ash buildup will still ultimately lead to excess material buildup and performance degradation. Consequently, the befouled DPF canisters must be replaced with fresh DPF canisters.

An issue arises where the DPF canisters as constructed can be turned around in the aftertreatment module instead of properly replaced and serviced. Money can be saved through such reuse, but blowing the accumulated soot and ash out through the aftertreatment system can potentially damage or render ineffective downstream components, or discharge the material into the atmosphere in violation of emission standards. Aftertreatment systems have been developed to prevent reversal of DPF canisters. For example, U.S. Pat. Appl. Publ. No. 2014/0041369 A1, published on Feb. 13, 2014, for Golin et al. and entitled, "Poka-Yoke Mounting System for an Exhaust Treatment Device," disclosed an exhaust treatment system including an exhaust treatment device having a stepped outer diameter. First and second clamps each include a stepped inner diameter such that the clamps engage the exhaust treatment device and other portions of the exhaust treatment system when the exhaust treatment device is properly oriented. The exhaust treatment device interferes with one of the clamps to preclude coupling the exhaust treatment device to an adjacent portion of the exhaust treatment system when an attempt is made to install the exhaust treatment device in a reversed improper orientation. A consistent exhaust flow direction through an exhaust treatment device such as a diesel particulate filter may be maintained through use of the system. The poka-yoke mounting system requires the modification and/or addition of multiple parts of the DPF canister retention components. In view of this, opportunities exist for improving DPF canisters and installation systems that ensure proper orientation and installation of the DPF canisters.

SUMMARY OF THE DISCLOSURE

In one aspect of the present disclosure, a DPF canister for an exhaust gas aftertreatment module is disclosed. The exhaust gas aftertreatment module may include a DPF receptacle with a cylindrical receptacle housing with a receptacle housing inlet end, a receptacle housing outlet end, a receptacle housing inner surface with a receptacle housing inner diameter, and a receptacle housing outer surface with a receptacle housing outer diameter, and an annular receptacle sealing flange attached to the receptacle housing outlet end and having a receptacle sealing flange inner diameter and a receptacle sealing flange outer diameter that is greater than the receptacle housing outer diameter. The DPF canister may include a cylindrical canister housing having a canister housing inlet end, a canister housing outlet end, a canister housing outer surface with a canister housing outer diameter that is less than the receptacle sealing flange inner diameter, and an annular canister outlet flange attached at the canister housing outlet end and having a canister outlet flange outer diameter that is greater than the receptacle sealing flange inner diameter. The DPF canister may further include an annular canister sealing flange installed on the canister housing outer surface between the canister housing inlet end and the canister housing outlet end, and having a canister sealing flange outer diameter that is greater than the receptacle sealing flange inner diameter, and a canister sealing flange inner diameter. When the canister housing inlet end is inserted through the annular receptacle sealing flange and into the receptacle housing, the annular canister sealing flange is engaged by the annular receptacle sealing flange.

In another aspect of the present disclosure, an exhaust gas aftertreatment module is disclosed. The exhaust gas aftertreatment module may include an aftertreatment module housing having an exhaust gas inlet side and an exhaust gas outlet side, a bulkhead disposed within the aftertreatment module housing and secured to inner walls of the aftertreatment module housing between the exhaust gas inlet side and the exhaust gas outlet side, the bulkhead having a plurality of DPF openings there through, and a plurality of DPF receptacles, wherein each of the plurality of DPF receptacles corresponds to and is disposed within one of the plurality of DPF openings of the bulkhead. Each of the plurality of DPF receptacles may include a cylindrical receptacle housing with a receptacle housing inlet end disposed on the exhaust gas inlet side of the bulkhead, a receptacle housing outlet end disposed on the exhaust gas outlet side of the bulkhead, a receptacle housing inner surface with a receptacle housing inner diameter, and a receptacle housing outer surface having a receptacle housing outer diameter and being attached to the bulkhead at the corresponding DPF opening, and an annular receptacle sealing flange attached to the receptacle housing outlet end and having a receptacle sealing flange inner diameter and a receptacle sealing flange outer diameter that is greater than the receptacle housing outer diameter. The exhaust gas aftertreatment module may further include a plurality of DPF canisters, wherein each of the plurality of DPF canisters respectively corresponds to and is disposed within one of the plurality of DPF receptacles. Each of the plurality of DPF canisters may include a cylindrical canister housing having a canister housing inlet end disposed on the exhaust gas inlet side of the annular receptacle sealing flange and within the receptacle housing, a canister housing outlet end disposed on the exhaust gas outlet side of the annular receptacle sealing flange, and a canister housing outer surface with a canister housing outer diameter that is less than the receptacle sealing flange inner diameter, and an annular canister outlet flange attached at the canister housing outlet end and having a canister outlet flange outer diameter that is greater than the receptacle sealing flange inner diameter. Each of the plurality of DPF canisters may further include an annular canister sealing flange installed on the canister housing outer surface between the canister housing inlet end and the canister housing outlet end, and having a canister sealing flange outer diameter that is greater than the receptacle sealing flange inner diameter, and canister sealing flange inner diameter, wherein the annular canister sealing flange abuts the annular receptacle sealing flange.

In a further aspect of the present disclosure, a method for installing a DPF canister in an exhaust gas aftertreatment module is disclosed. The exhaust gas aftertreatment module may include a bulkhead disposed within an aftertreatment module housing and secured to inner walls of the aftertreatment module housing between an exhaust gas inlet side and an exhaust gas outlet side, and a DPF receptacle installed within a DPF opening through the bulkhead, wherein the DPF receptacle includes a cylindrical receptacle housing with an annular receptacle sealing flange attached to a first receptacle housing end on one of the exhaust gas inlet side and the exhaust gas outlet side of the bulkhead. The method for installing the DPF canister may include positioning the DPF canister on the same one of the exhaust gas inlet side and the exhaust gas outlet side of the bulkhead within the aftertreatment module housing as the annular receptacle sealing flange. The DPF canister may include a cylindrical canister housing having a first canister housing end, a second canister housing end, and a canister housing outer surface with a canister housing outer diameter that is less than a receptacle sealing flange inner diameter, a first canister end flange attached at the first canister housing end and having a first canister end flange outer diameter that is greater than the receptacle sealing flange inner diameter, and an annular canister sealing flange installed on the canister housing outer surface between the first canister housing end and the second canister housing end, and having a canister sealing flange outer diameter that is greater than the receptacle sealing flange inner diameter. The method for installing the DPF canister may further include orienting the DPF canister with the second canister housing end disposed proximate the first receptacle housing end of the DPF receptacle and the first canister housing end disposed remotely from the first receptacle housing end, inserting the second canister housing end through the annular receptacle sealing flange and into the receptacle housing until the annular canister sealing flange abuts the annular receptacle sealing flange, and engaging the annular receptacle sealing flange and the annular canister sealing flange with a fastening device to fix the DPF canister relative to the DPF receptacle and the bulkhead, and to form a substantially airtight seal between the annular receptacle sealing flange and the annular canister sealing flange.

Additional aspects are defined by the claims of this patent.

DETAILED DESCRIPTION

Figure 1:
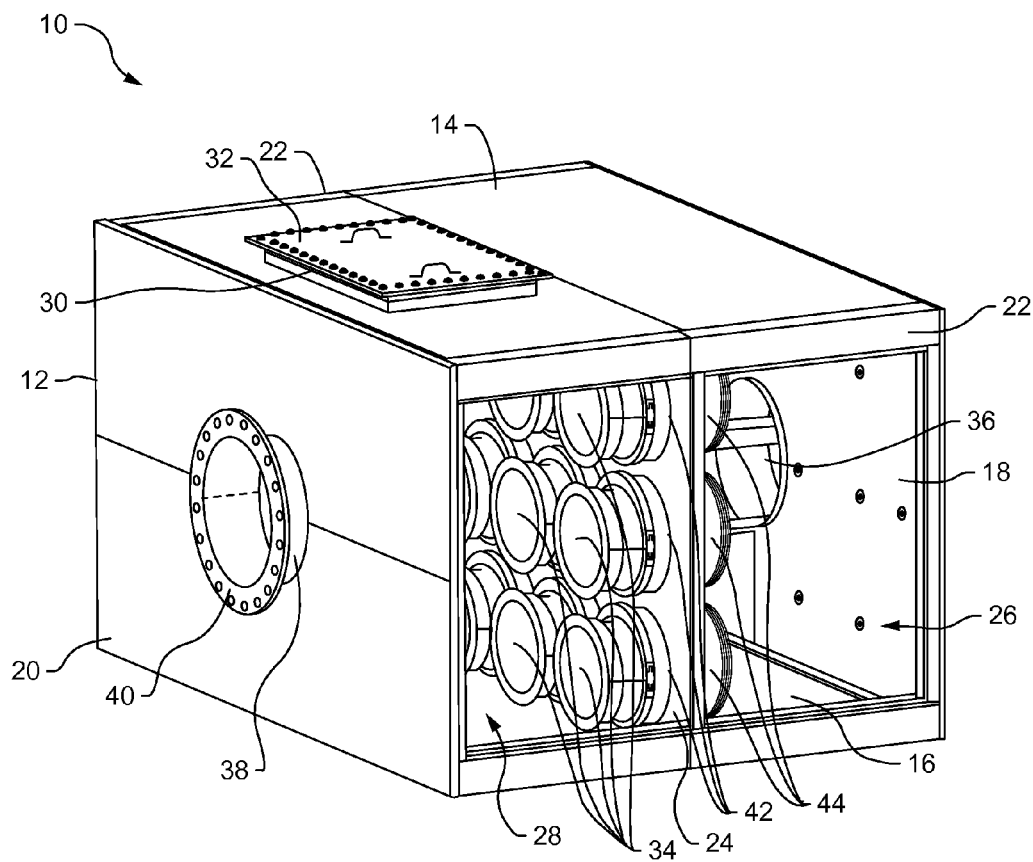
FIG. 1 is a perspective view of an exhaust gas aftertreatment module with a side wall removed for depiction of internal components of the module in which DPF canisters and installation methods in accordance with the present disclosure may be implemented.

FIG. 1 illustrates one embodiment of an exhaust gas aftertreatment module 10 incorporating unidirectional DPF canister installation features in accordance with the present disclosure. The aftertreatment module 10 may have a generally cubic-shaped aftertreatment module housing 12 having a top wall 14, and a bottom wall 16, an exhaust gas inlet side wall 18, an exhaust gas outlet side wall 20, and a pair of opposed side walls 22 (one hidden and one removed to show the internal components of the module 10). Within the module housing 12, a bulkhead 24 may be installed and secured to interior surfaces of the walls 14, 16, 22 via welding or other appropriate attachment mechanisms to prevent air flow between the bulkhead 24 and the walls 14, 16, 22. Configured in this way, the bulkhead 24 may divide the interior of the module housing 12 into an exhaust gas inlet side 26 and an exhaust gas outlet side 28.

The module housing 12 may have multiple access points to the interior of the module housing 12. The top of 14 may include an access opening 30 sealed by an access door 32 that may be removed to provide access to the interior of the module housing 12. The access opening 30 may be positioned on the exhaust gas outlet side 28 of the top wall 14 and the bulkhead 24 to provide access for replacement of DPF canisters 34 as discussed further below. An exhaust gas inlet opening 36 through the inlet side wall 18 may include an inlet flange (not shown) for connection of a conduit carrying exhaust gas from a diesel engine, and an exhaust gas outlet 38 through the outlet side wall 20 may include an outlet flanged 40 for connection to downstream $NO_x$ treatment components of the aftertreatment system.

Within the module housing 12, the DPF canisters 34 are installed in corresponding DPF openings 42 through the bulkhead 24. The number and configuration of the DPF canisters 34 and the DPF openings 42 may be varied as necessary based on the desired filtration, the available space within the module housing 12, the size of the DPF canisters 34 and other factors. Moreover, the cubic shape of the module housing 12 is exemplary, and the module housing 12 may have any appropriate shape and size to fit within the space available for installation of the exhaust gas aftertreatment module 10. The DPF canisters 34 may be received within corresponding DPF receptacles 44 mounted within the DPF openings 42 so that the exhaust gas entering through the exhaust gas inlet opening 36 will flow through the DPF canisters 34 mounted within the DPF receptacles 44.

Figure 2:
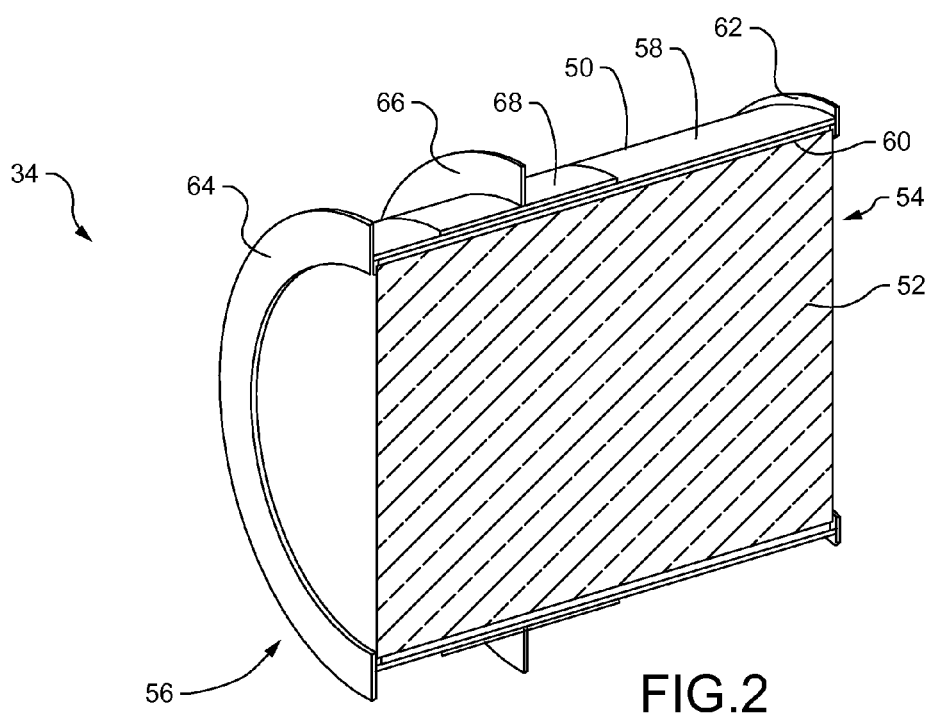
FIG. 2 is a perspective view of a cross-section of a DPF canister in accordance with the present disclosure.
Figure 3:
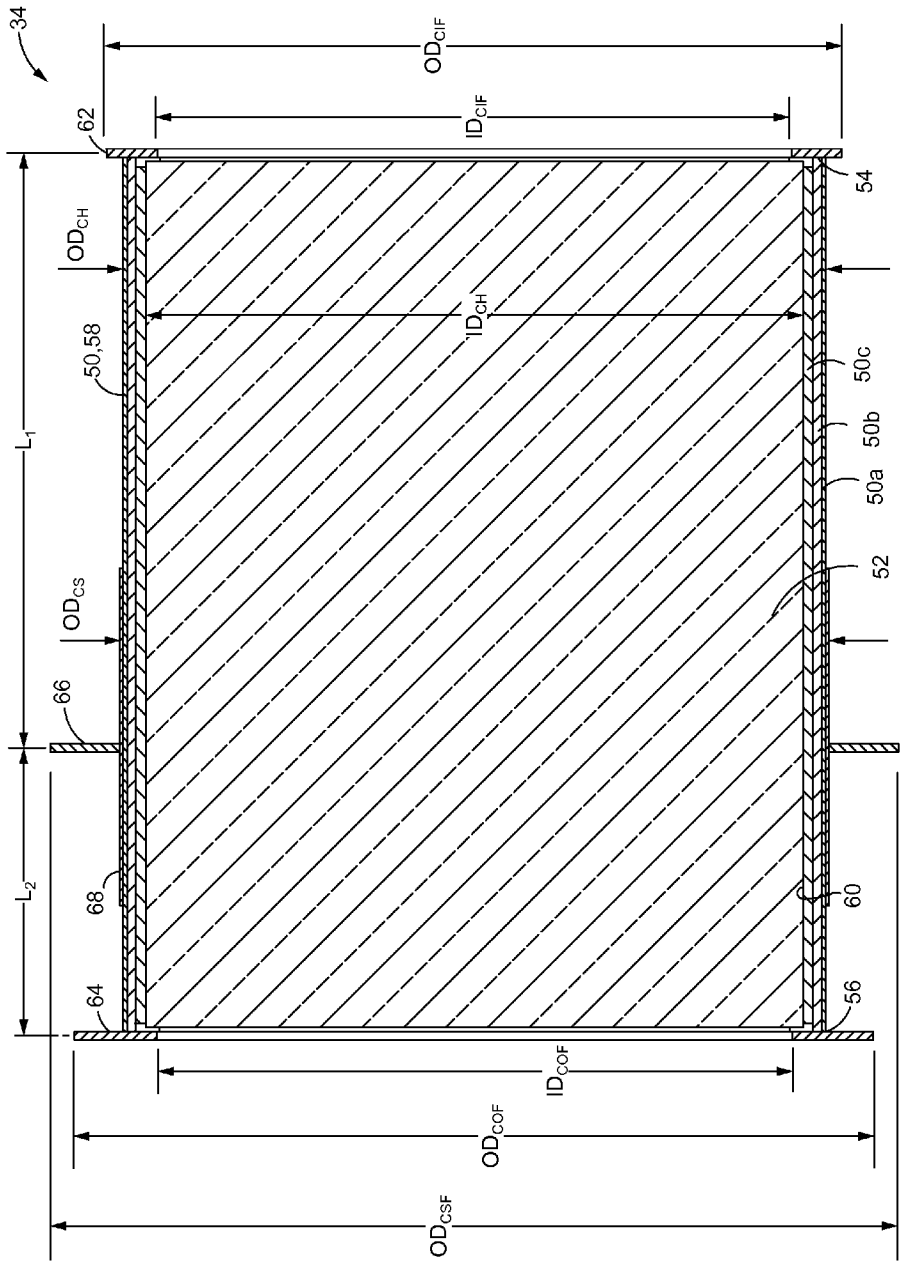
FIG. 3 is a side view of the cross-section of the DPF canister of FIG. 2.

FIGS. 2 and 3 illustrate one example of a DPF canister 34 having unidirectional installation features for proper installation of the aftertreatment module 10. The DPF canisters 34 may be formed primarily from a hollow cylindrical canister housing 50 having an appropriate filtering material 52 disposed therein. The filtering material 52 may be any appropriate material or combination of elements providing a desired level of filtration of particulate matter from the exhaust gas, such as wall flow filter arrangements, ceramic fiber filters, metal fiber filters, paper, partial filters and the like. The canister housing 50 may be formed from a single hollow cylinder, or from a plurality of layers 50a, 50b, 50c (FIG. 3) to provide desired structural and thermodynamic properties. For example, the outermost layer 50a may be an outer shell made of stainless steel, while the inner layers 50b, 50c may be formed from mat materials that provide retention for the filtering material 52, and are compressible to an extent when cold and expandable when heated. The canister housing 50 may have a canister housing inlet end 54 and an oppositely disposed canister housing outlet end 56, a canister housing outer surface 58 with a canister housing outer diameter $OD_{CH}$, and a canister housing inner surface 60 with a canister housing inner diameter $ID_{CH}$.

The unidirectional installation feature of the DPF canisters 34 may be achieved through a series of exterior flanges 62, 64, 66 that may interact with corresponding structures of the DPF receptacles 44 for alignment and securement of the DPF canisters 34 as will be discussed further below. An annular canister inlet flange 62 may be attached at the canister housing inlet end 54, and may have a canister inlet flange outer diameter $OD_{CIF}$ that is greater than the canister housing outer diameter $OD_{CH}$ and a canister inlet flange inner diameter $ID_{CIF}$ that is less than the canister housing inner diameter $ID_{CH}$ to thereby provide a first annular lip at the inlet end 54 to retain the filtering material 52 within the canister housing 50. Opposite the canister inlet flange 62, an annular canister outlet flange 64 may be attached at the canister housing outlet end 56, and may have a canister outlet flange outer diameter $OD_{COF}$ that is greater than the canister housing outer diameter $OD_{CH}$ and a canister outlet flange inner diameter $ID_{COF}$ that is less than the canister housing inner diameter $ID_{CH}$ to provide a second annular lip at the outlet end 56 for retention of the filtering material 52.

An annular canister sealing flange 66 may be installed on the canister housing outer surface 58 between the canister inlet flange 62 and the canister outlet flange 64. The canister sealing flange 66 may be attached directly to the canister housing outer surface 58 by welding or other appropriate connection mechanism to provide a substantially airtight seal. Alternatively, as shown in the drawing figures, the canister sealing flange 66 may be mounted on a hollow cylindrical canister sleeve 68 having a canister sleeve inner surface with a canister sleeve inner diameter $ID_{CS}$ (not labeled) and a canister sleeve outer surface with a canister sleeve outer diameter $OD_{CS}$, with the canister sleeve 68 then being installed on the canister housing outer surface 58. The canister sleeve 68 may provide additional support structure as the canister sealing flange 66 is the primary attachment mechanism for retaining the DPF canister 34 within the corresponding DPF receptacle 44. As best seen in FIG. 3, the canister sealing flange 66 is positioned at a first distance $L_1$ from the canister inlet flange 62, and at a second distance $L_2$ from the canister outlet flange 64. The first distance $L_1$ is greater than the second distance $L_2$ so that a majority of the DPF canister 34 will be disposed within the DPF receptacle 44 after installation. In one embodiment, a ratio of the first distance L1 to the second distance L2 is approximately equal to 2.0 such that the canister sealing flange 66 is positioned approximately two thirds of the distance from the canister inlet flange 62 to the canister outlet flange 64. As is further evident from FIG. 3, the canister sealing flange 66 has a canister sealing flange outer diameter $OD_{CSF}$ that is greater than the canister inlet flange outer diameter $OD_{CIF}$ and the canister outlet flange outer diameter $OD_{COF}$. Moreover, as will be shown to be significant to the discussion below, the canister outlet flange outer diameter $OD_{COF}$ is greater than the canister inlet flange outer diameter $OD_{CIF}$.

Figure 4:
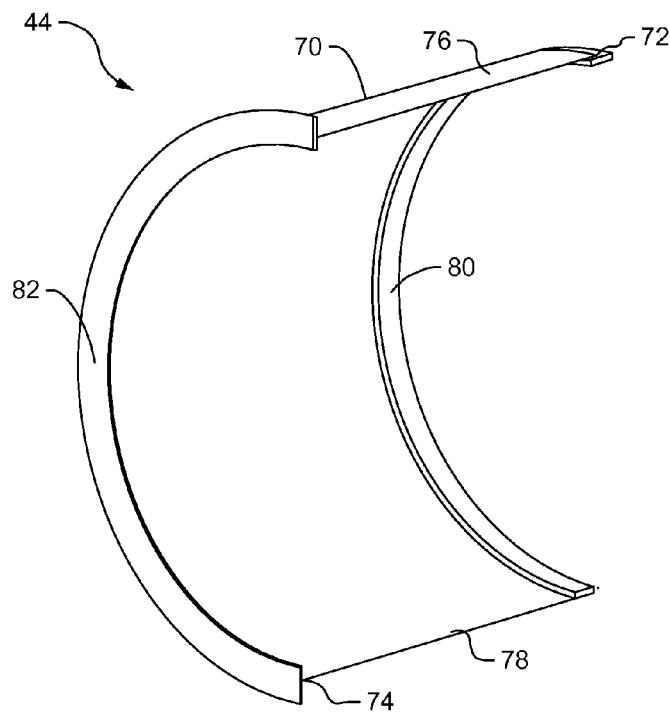
FIG. 4 is a perspective view of a cross-section of a DPF receptacle in accordance with the present disclosure.
Figure 5:
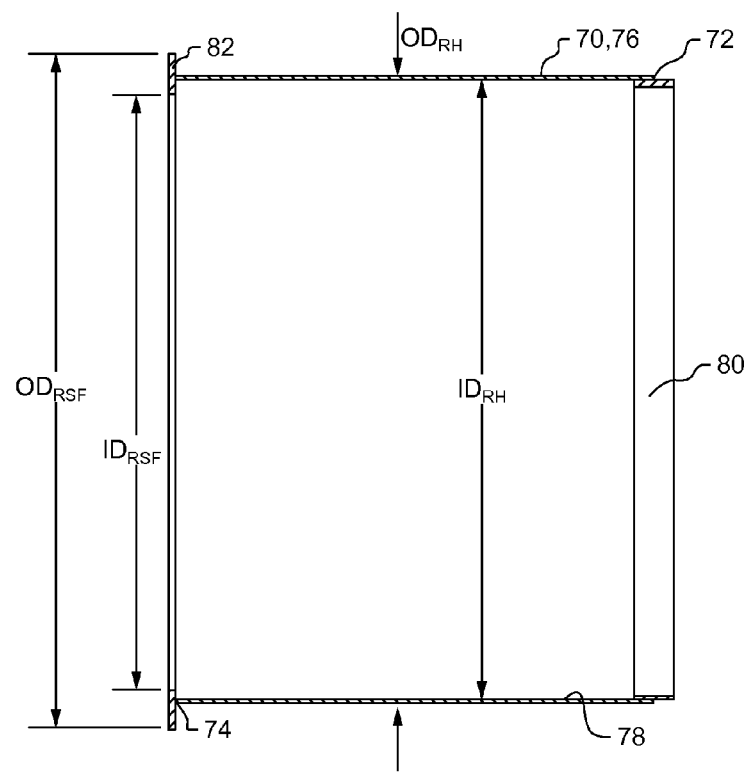
FIG. 5 is a side view of the cross-section of the DPF receptacle of FIG. 4.

An example of the DPF receptacle 44 is shown in greater detail in FIGS. 4 and 5. The DPF receptacle 44 may include a hollow cylindrical receptacle housing 70 having a receptacle housing inlet end 72 that will be disposed on the exhaust gas inlet side 26 of the bulkhead 24, and a receptacle housing outlet end 74 that will be disposed on the exhaust gas outlet side 28 of the bulkhead 24 when the DPF receptacle 44 is installed in the corresponding DPF opening 42 of the bulkhead 24. The DPF receptacle 44 has a receptacle housing outer surface 76 having a receptacle housing outer diameter $OD_{RH}$, and a receptacle housing inner surface 78 having a receptacle housing inner diameter $ID_{RH}$. The receptacle housing inner diameter $ID_{RH}$ may be greater than the canister housing outer diameter $OD_{CH}$ and the canister inlet flange outer diameter $OD_{CIF}$ so that a portion of the DPF canister 34 may be inserted within the receptacle housing 70 during installation. For additional structural support, the receptacle support ring 80 may be attached to the receptacle housing 70 at the receptacle housing inlet end 72.

Opposite the receptacle inlet end 72 and the receptacle support ring 80, an annular receptacle sealing flange 82 may be attached at the receptacle housing outlet end 74. The receptacle sealing flange 82 may have a receptacle sealing flange outer diameter $OD_{RSF}$ that is greater than the receptacle housing outer diameter $OD_{RH}$ and a receptacle sealing flange inner diameter $ID_{RSF}$ that is less than or equal to the receptacle housing inner diameter $ID_{RH}$. The receptacle sealing flange 82 may form the complementary portion of the unidirectional installation feature to the flanges 62, 64, 66 of the DPF canister 34. Consequently, the receptacle sealing flange inner diameter $ID_{RSF}$ may be greater than the canister inlet flange outer diameter $OD_{CIF}$ and the canister housing outer diameter $OD_{CH}$ so that the canister housing inlet end 54 and the canister inlet flange 62 may be inserted there through. At the same time, the receptacle sealing flange inner diameter $ID_{RSF}$ may be less than the canister sealing flange outer diameter $OD_{CSF}$ and the canister outlet flange outer diameter $OD_{COF}$ so that neither the canister sealing flange 66 nor the canister outlet flange 64 may be inserted there through.

Figure 6:
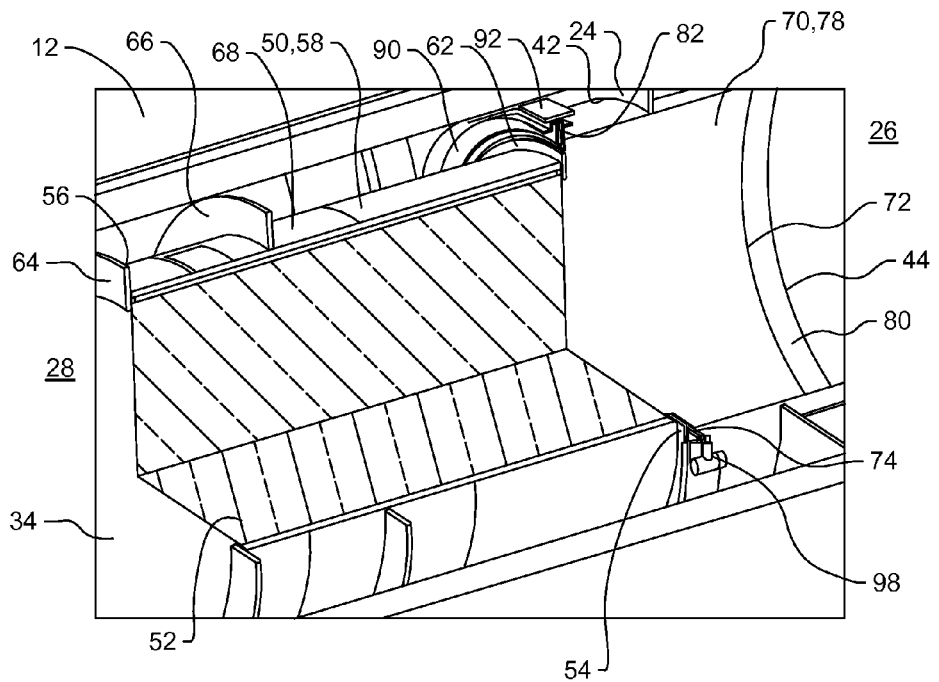
FIG. 6 is a partial cross-sectional perspective view of the DPF canister of FIG. 2 oriented for installation into the DPF receptacle of FIG. 4.

The relationship between the DPF canister 34 and the DPF receptacle 44 is illustrated in greater detail in FIGS. 6-9. Referring to FIG. 6, the DPF canister 34 is shown within the exhaust gas outlet side 28 of the module housing 12 and properly oriented prior to insertion into the DPF receptacle 44. As shown, the DPF canister 34 is oriented with the canister housing inlet end 54 and the canister inlet flange 62 disposed proximate the receptacle housing outlet end 74 and the receptacle sealing flange 82, and the canister housing outlet end 56 and the canister outlet flange 64 disposed remotely from the DPF receptacle 44. Because the canister inlet flange outer diameter $OD_{CIF}$ is smaller than the receptacle sealing flange inner diameter $ID_{RSF}$, the canister inlet flange 62 may be inserted through the receptacle sealing flange 82 toward the installed position shown in FIG. 7. As the canister inlet flange 62 and the canister housing 50 are inserted through the receptacle sealing flange 82, a receptacle sealing flange surface of the receptacle sealing flange 82 ultimately abuts and is engaged by a facing canister sealing flange surface of the canister sealing flange 66. Further insertion of the DPF canister 34 into the DPF receptacle 44 is prevented because the receptacle sealing flange inner diameter $ID_{RSF}$ is less than the canister sealing flange outer diameter $OD_{CSF}$, thereby preventing the canister sealing flange 66 from passing through the receptacle sealing flange 82.

With the DPF canister 34 fully inserted into the DPF receptacle 44 and the canister sealing flange 66 dispose proximate the receptacle sealing flange 82, the sealing flanges 66, 82 may be secured to each other to retain the DPF canister 34 in place and to form an airtight seal there between to prevent exhaust gas from circumventing the filtering material 52. To assist in forming the airtight seal, an annular gasket 90 formed from an elastomeric material may be disposed between the sealing flanges 66, 82 and compressed there between. The gasket 90 may have a gasket inner diameter that is greater than a canister sealing flange inner diameter $ID_{CSF}$ and a gasket outer diameter that is not greater than the canister sealing flange outer diameter $OD_{CSF}$. The gasket 90 may be a separate detached component from the sealing flanges 66, 82, or the gasket 90 may have a gasket surface adhered to one of the facing sealing flange surfaces of the sealing flanges 66, 82 prior to the installation of the DPF canister 34.

Figure 7:
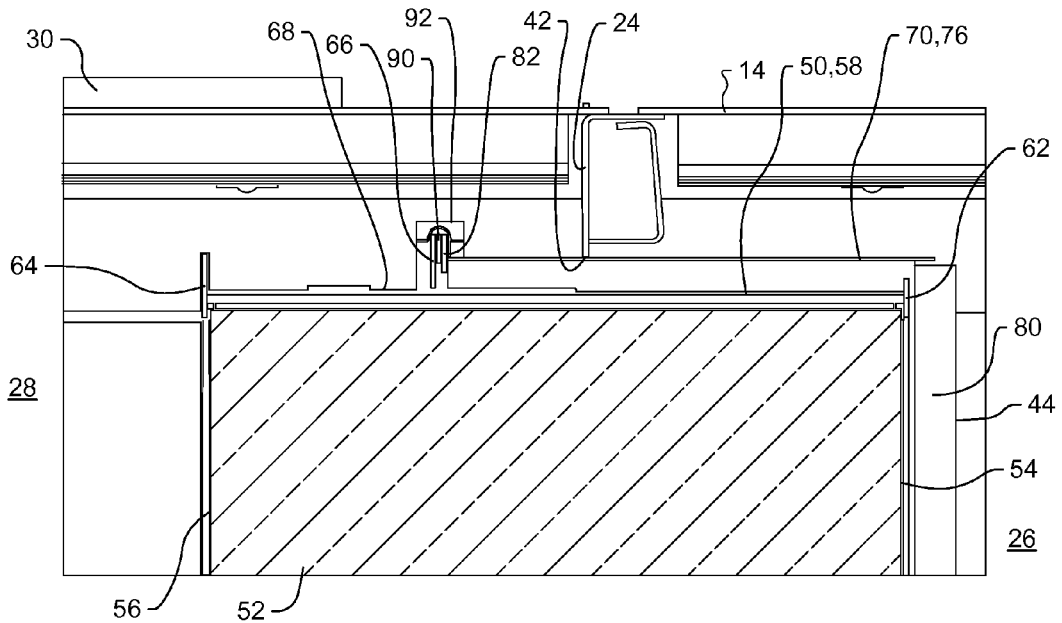
FIG. 7 is a partial side cross-sectional view of the DPF canister of FIG. 2 installed in the DPF receptacle of FIG. 4.
Figure 8:
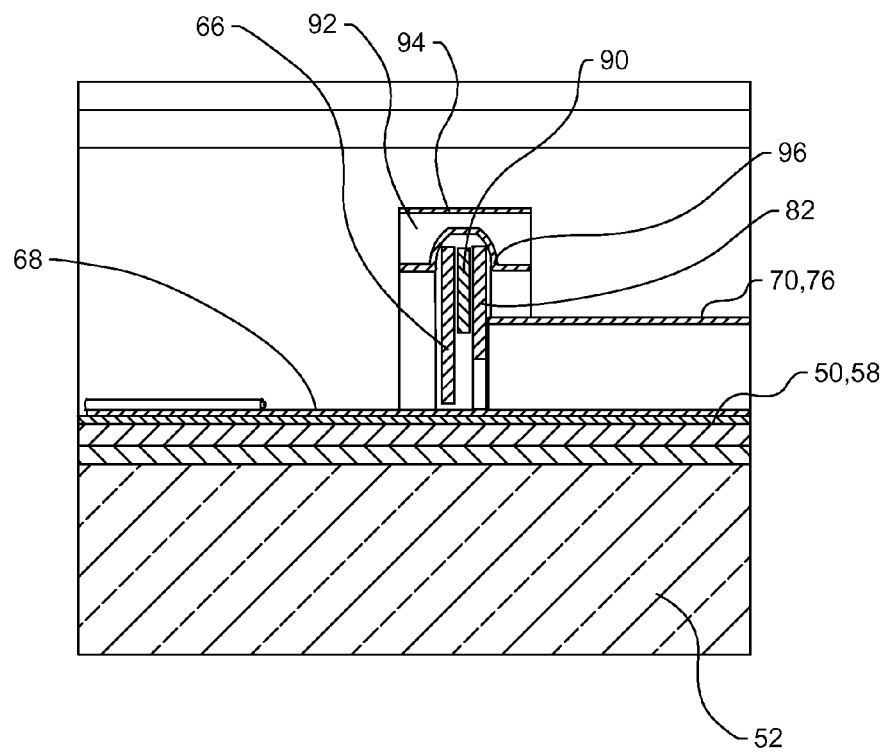
FIG. 8 is an enlarged cross-sectional view of the sealing flanges of the DPF canister of FIG. 2 and the DPF receptacle of FIG. 4 engaged by a clamp for retention of the DPF canister.

With the gasket 90 in place and the sealing flanges 66, 82 adjacent to each other, the sealing flanges 66, 82 may be secured and maintained fixed together by any appropriate fastening device that will form the airtight seal around the entire circumference of the DPF canister 34 and the DPF receptacle 44. For example, as shown in FIGS. 6-8, the sealing flanges 66, 82 may be encircled, engaged and secured by an annular clamp 92 that is a V-band or Marman-type clamp system that is known in the art for joining two flat cylindrical interfaces to fix the interfaces relative to each other. As best seen in the enlarge view of FIG. 8, the clamp 92 may be formed by an outer band 94 and an inner band 96 having a V-shaped channel dimensioned to receive the outer edges of the sealing flanges 66, 82 and force the facing surfaces of the sealing flanges 66, 82 to compress the gasket 90 there between and form the airtight seal. The clamp 92 may include an appropriate adjustment mechanism 98 that allows the outer band 94 and the inner band 96 to be tightened down around the sealing flanges 66, 82, and to be loosened so that the canister sealing flange 66 may be disengaged from the clamp 92 and the receptacle sealing flange 82 when the DPF canister 34 is befouled by soot and ash requires replacement with a fresh DPF canister 34.

Figure 9:
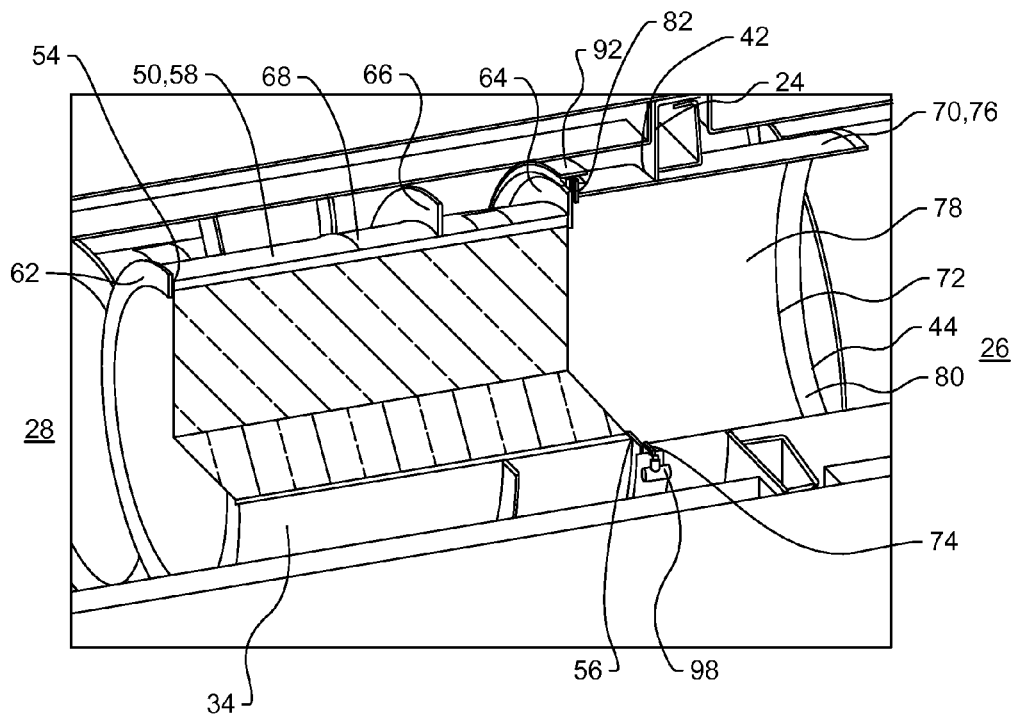
FIG. 9 is a partial cross-sectional perspective view of the DPF canister of FIG. 2 improperly oriented with respect to the DPF receptacle of FIG. 4.

When the befouled DPF canister 34 is removed from the DPF receptacle 44, the unidirectional installation feature prevents the DPF canister 34 from being turned around and having the canister housing outlet end 56 inserted into the DPF receptacle 44. Such a reorientation of the DPF canister 34 is shown in FIG. 9. As the DPF canister 34 moves toward the DPF receptacle 44, the canister outlet flange 64 is engaged by the receptacle sealing flange 82. Because the canister outlet flange outer diameter $OD_{COF}$ is greater than the receptacle sealing flange inner diameter $ID_{RSF}$, the receptacle sealing flange 82 prevents the canister outlet flange 64 and the canister housing outlet end 56 from being forced past the receptacle sealing flange 82 and into the receptacle housing 70. The DPF canister 34 as positioned in FIG. 9 could still be able to receive exhaust gas from the exhaust gas inlet side 26. However, the canister outlet flange 64 is configured with the canister outlet flange outer diameter $OD_{COF}$ being smaller than the receptacle sealing flange outer diameter $OD_{RSF}$. As a result, when the clamp 92 is secured around the outer edge of the receptacle sealing flange 82, the outer edge of the canister outlet flange 64 will not be received within the V-shaped channel of the inner band 96 in a manner that will secure the DPF canister 34 to the receptacle sealing flange 82. With this configuration, the DPF canister 34 cannot be installed improperly in the orientation shown in FIG. 9, and the risk of blowing the accumulated soot and ash out to the downstream aftertreatment components or the surrounding atmosphere is virtually eliminated.

INDUSTRIAL APPLICABILITY

Figure 10:
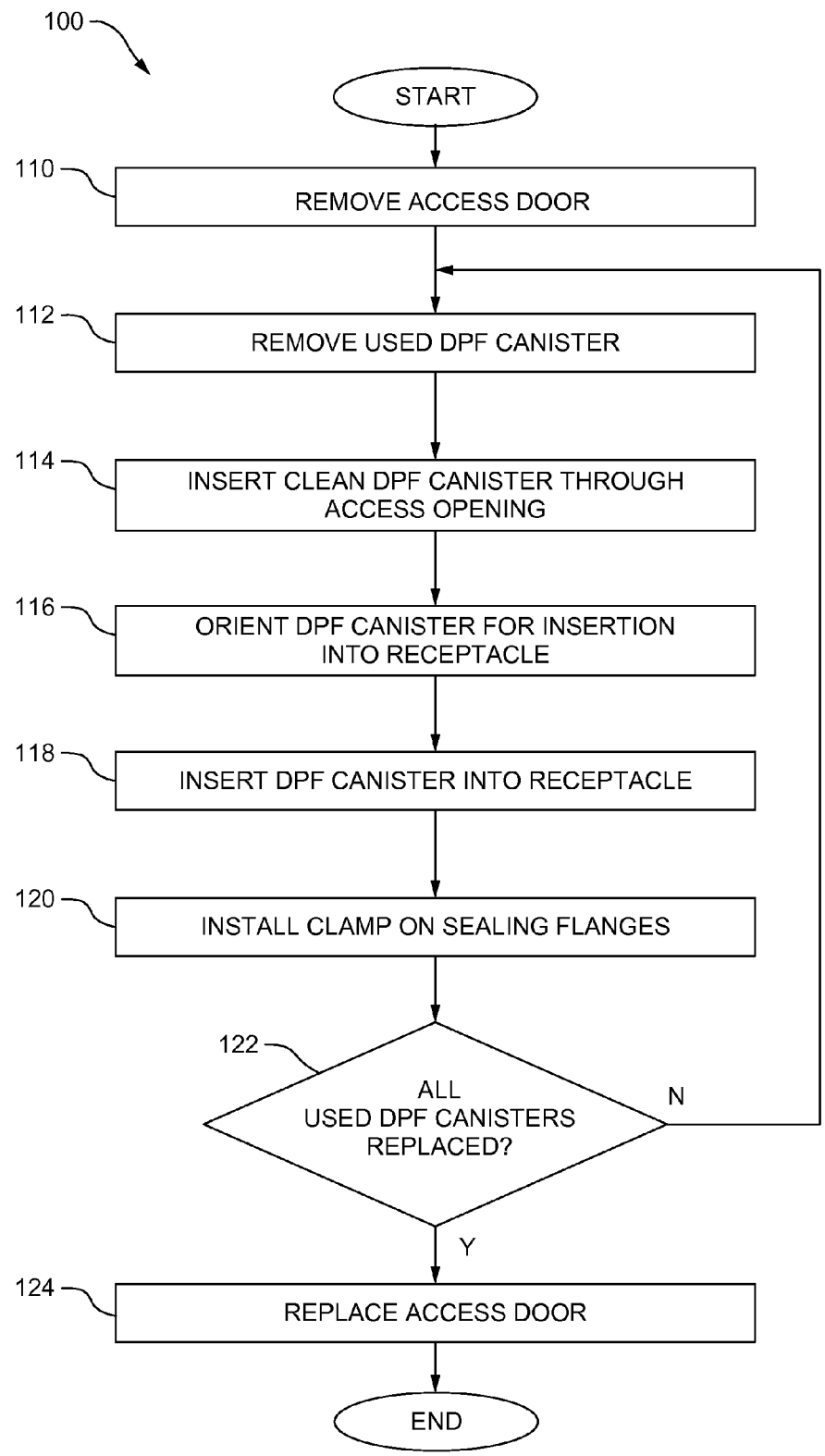
FIG. 10 is a flow diagram of an exemplary DPF canister replacement routine in accordance with the present disclosure that may be implemented in the exhaust gas aftertreatment module of FIG. 1.

With the configuration illustrated and described above with the unidirectional replacement feature, the DPF canister 34 can only be installed in the DPF receptacle 44 with the proper orientation. FIG. 10 illustrates an exemplary embodiment of a DPF canister replacement and/or installation routine 100. The routine 100 may start at a block 110 where the installer may remove the access door 32 from the top wall 14 of the module housing 12 so that the interior of the module housing 12 may be accessed. With the access door 32 removed, the exhaust gas outlet side 28 of the module housing 12 may be entered via the uncovered access opening 30. After the access door 32 is removed, a used DPF canister 34 may be removed from the corresponding DPF receptacle 44 at a block 112. The adjustment mechanism 98 of the clamp 92 may be manipulated to loosen the clamp 92 to allow the canister sealing flange 66 to be removed from the V-shaped channel of the inner band 96. With the clamp 92 loosened, the DPF canister 34 may be pulled out of the DPF receptacle 44. For the reasons discussed above, the DPF canister 34 cannot be turned around and reattached at the canister outlet flange 64. Consequently, the DPF canister 34 is then removed from the module housing 12 through the access opening 30.

After the befouled DPF canister 34 is removed, a new or refurbished DPF canister 34 may be inserted into the module housing 12 through the access opening 30 at a block 114. After positioning the replacement DPF canister 34 by the corresponding DPF receptacle 44, at a block 116, the DPF canister 34 may be oriented for insertion into the DPF receptacle 44. As discussed above, the canister housing inlet end 54 and the canister inlet flange 62 will be disposed proximate the receptacle housing outlet end 74 and the receptacle sealing flange 82, and the canister housing outlet end 56 and the canister outlet flange 64 will be disposed remotely from the DPF receptacle 44 so that the canister housing 50 may be inserted into the receptacle housing 70 at a block 118.

The canister housing 50 is inserted through the receptacle sealing flange 82 until the canister sealing flange 66 is engaged by the receptacle sealing flange 82. With the sealing flanges 66, 82 positioned, the clamp 92 may be installed on the sealing flanges 66, 82 at a block 120. The edges of the sealing flanges 66, 82 may be aligned within the V-shaped channel of the inner band 96 and the adjustment mechanism 98 may be manipulated to tighten the clamp 92 down around the sealing flanges 66, 82. With the replacement DPF canister 34 installed, it may be determined whether all the used DPF canisters 34 have been replaced at a block 122. If there are additional DPF canisters 34 to be replaced, control of the routine 100 may pass back to the block 112 to remove and replace the next befouled DPF canister 34. If all DPF canisters 34 have been replaced at the block 122, the access door 32 can be replaced and resealed on the access opening 30 at the block 124.

As illustrated and discussed herein, the DPF canisters 34 and the PDF receptacles 44 are designed for the DPF canisters 34 to be installed from the exhaust gas outlet side 28 of the aftertreatment module housing 12. In alternate embodiments, the exhaust gas aftertreatment module 10 may configured for the DPF canisters 34 to be installed from the exhaust gas inlet side 26 of the bulkhead 24. In such an arrangement, the access opening 30 may be positioned on the exhaust inlet side of the top wall 14 and the bulkhead 24, and the DPF receptacles 44 may be reconfigured to receive the DPF canisters 34 from the inlet side when properly oriented. For example, the DPF receptacles 44 may be reversed from the position shown in FIG. 7 with the receptacle sealing flange 82 and the clamp 92 being disposed on the inlet side 26 of the bulkhead 24 and the receptacle housing inlet end 72 being disposed on the outlet side 28. The DPF canister 34 may be inserted into the module housing 12 on the inlet side 26 and oriented with the canister housing end 54 and the canister flange 62 disposed proximate the receptacle housing end 74 and receptacle sealing flange 82 so that the canister housing end 54 can be inserted into the receptacle housing 70 through the receptacle sealing flange 82.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A diesel particulate filter (DPF) canister for an exhaust gas aftertreatment module having a DPF receptacle with a cylindrical receptacle housing with a receptacle housing inlet end, a receptacle housing outlet end, a receptacle housing inner surface with a receptacle housing inner diameter, and a receptacle housing outer surface with a receptacle housing outer diameter, and an annular receptacle sealing flange attached to the receptacle housing outlet end and having a receptacle sealing flange inner diameter and a receptacle sealing flange outer diameter that is greater than the receptacle housing outer diameter, the DPF canister comprising:
    a cylindrical canister housing having a canister housing inlet end, a canister housing outlet end, a canister housing outer surface with a canister housing outer diameter that is less than the receptacle sealing flange inner diameter;
    an annular canister outlet flange attached at the canister housing outlet end and having a canister outlet flange outer diameter that is greater than the receptacle sealing flange inner diameter; and
    an annular canister sealing flange installed on the canister housing outer surface between the canister housing inlet end and the canister housing outlet end, and having a canister sealing flange outer diameter that is greater than the receptacle sealing flange inner diameter, and a canister sealing flange inner diameter, wherein, when the canister housing inlet end is inserted through the annular receptacle sealing flange and into the cylindrical receptacle housing, the annular canister sealing flange is engaged by the annular receptacle sealing flange, and wherein the canister outlet flange outer diameter is less than the canister sealing flange outer diameter.

2. The DPF canister of claim 1, comprising an annular canister inlet flange attached at the canister housing inlet end and having a canister inlet flange outer diameter that is less than the receptacle sealing flange inner diameter.

3. The DPF canister of claim 1, wherein a first distance from the canister housing inlet end to the annular canister sealing flange is greater than a second distance from the canister housing outlet end to the annular canister sealing flange.

4. The DPF canister of claim 1, wherein the annular canister sealing flange is attached directly to the canister housing outer surface.

5. The DPF canister of claim 1, comprising a cylindrical canister sleeve having a canister sleeve inner surface with a canister sleeve inner diameter that is greater than the canister housing outer diameter, and a canister sleeve outer surface, wherein the cylindrical canister sleeve is installed on the canister housing outer surface and the annular canister sealing flange is attached to the canister sleeve outer surface.

6. The DPF canister of claim 1, comprising an annular gasket having a gasket inner diameter that is greater than the canister sealing flange inner diameter and a gasket outer diameter that is not greater than the canister sealing flange outer diameter, and wherein the annular gasket has a gasket surface facing and attached to a corresponding canister sealing flange surface of the annular canister sealing flange.

7. The DPF canister of claim 1, wherein the canister sealing flange outer diameter is approximately equal to the receptacle sealing flange outer diameter.

8. An exhaust gas aftertreatment module, comprising:
an aftertreatment module housing having an exhaust gas inlet side and an exhaust gas outlet side;
a bulkhead disposed within the aftertreatment module housing and secured to inner walls of the aftertreatment module housing between the exhaust gas inlet side and the exhaust gas outlet side, the bulkhead having a plurality of diesel particulate filter (DPF) openings there through;
a plurality of DPF receptacles, wherein each of the plurality of DPF receptacles corresponds to and is disposed within one of the plurality of DPF openings of the bulkhead, each of the plurality of DPF receptacles comprising:
  a cylindrical receptacle housing with a receptacle housing inlet end disposed on the exhaust gas inlet side of the bulkhead, a receptacle housing outlet end disposed on the exhaust gas outlet side of the bulkhead, a receptacle housing inner surface with a receptacle housing inner diameter, and a receptacle housing outer surface having a receptacle housing outer diameter and being attached to the bulkhead at the corresponding DPF opening, and
  an annular receptacle sealing flange attached to the receptacle housing outlet end and having a receptacle sealing flange inner diameter and a receptacle sealing flange outer diameter that is greater than the receptacle housing outer diameter; and
a plurality of DPF canisters, wherein each of the plurality of DPF canisters respectively corresponds to and is disposed within one of the plurality of DPF receptacles, each of the plurality of DPF canisters comprising:
  a cylindrical canister housing having a canister housing inlet end disposed on the exhaust gas inlet side of the annular receptacle sealing flange and within the receptacle housing, a canister housing outlet end disposed on the exhaust gas outlet side of the annular receptacle sealing flange, and a canister housing outer surface with a canister housing outer diameter that is less than the receptacle sealing flange inner diameter,
  an annular canister outlet flange attached at the canister housing outlet end and having a canister outlet flange outer diameter that is greater than the receptacle sealing flange inner diameter, and
  an annular canister sealing flange installed on the canister housing outer surface between the canister housing inlet end and the canister housing outlet end, and having a canister sealing flange outer diameter that is greater than the receptacle sealing flange inner diameter, and canister sealing flange inner diameter, wherein the annular canister sealing flange abuts the annular receptacle sealing flange.

9. The exhaust gas aftertreatment module of claim 8, comprising an annular clamp encircling and engaging the annular canister sealing flange and the annular receptacle sealing flange to maintain the DPF canister fixed with respect to the bulkhead and the corresponding one of the plurality of DPF receptacles.

10. The exhaust gas aftertreatment module of claim 8, wherein the aftertreatment module housing comprises an access opening through a wall of the aftertreatment module housing on the exhaust gas outlet side of the bulkhead.

11. The exhaust gas aftertreatment module of claim 8, wherein each of the plurality of DPF canisters comprises an annular canister inlet flange attached at the canister housing inlet end and having a canister inlet flange outer diameter that is less than the receptacle sealing flange inner diameter.

12. The exhaust gas aftertreatment module of claim 8, wherein, for each of the plurality of DPF canisters, a first distance from the canister housing inlet end to the annular canister sealing flange is greater than a second distance from the canister housing outlet end to the annular canister sealing flange such that more than 50% of the DPF canister is disposed within the corresponding one of the plurality of DPF receptacles.

13. The exhaust gas aftertreatment module of claim 8, wherein each of the plurality of DPF canisters comprises a cylindrical canister sleeve having a canister sleeve inner surface with a canister sleeve inner diameter that is greater than the canister housing outer diameter, and a canister sleeve outer surface, wherein the cylindrical canister sleeve is installed on the canister housing outer surface and the annular canister sealing flange is attached to the canister sleeve outer surface.

14. The exhaust gas aftertreatment module of claim 8, wherein each of the plurality of DPF canisters comprises an annular gasket having a gasket inner diameter that is greater than the canister sealing flange inner diameter and a gasket outer diameter that is not greater than the canister sealing flange outer diameter, and wherein the annular gasket is disposed between the annular canister sealing flange and the annular receptacle sealing flange.

15. A method for installing a diesel particulate filter (DPF) canister in an exhaust gas aftertreatment module having a bulkhead disposed within an aftertreatment module housing and secured to inner walls of the aftertreatment module housing between an exhaust gas inlet side and an exhaust gas outlet side, and a DPF receptacle installed within a DPF opening through the bulkhead, wherein the DPF receptacle includes a cylindrical receptacle housing with an annular receptacle sealing flange attached to a first receptacle housing end on one of the exhaust gas inlet side and the exhaust gas outlet side of the bulkhead, the method for installing the DPF canister comprising:
  positioning the DPF canister on the same one of the exhaust gas inlet side and the exhaust gas outlet side of the bulkhead within the aftertreatment module housing as the annular receptacle sealing flange, wherein the DPF canister comprises a cylindrical canister housing having a first canister housing end, a second canister housing end, and a canister housing outer surface with a canister housing outer diameter that is less than a receptacle sealing flange inner diameter, a first canister end flange attached at the first canister housing end and having a first canister end flange outer diameter that is greater than the receptacle sealing flange inner diameter, and an annular canister sealing flange installed on the canister housing outer surface between the first canister housing end and the second canister housing end, and having a canister sealing flange outer diameter that is greater than the receptacle sealing flange inner diameter;
  orienting the DPF canister with the second canister housing end disposed proximate the first receptacle housing end of the DPF receptacle and the first canister housing end disposed remotely from the first receptacle housing end;
  inserting the second canister housing end through the annular receptacle sealing flange and into the receptacle housing until the annular canister sealing flange abuts the annular receptacle sealing flange; and engaging the annular receptacle sealing flange and the annular canister sealing flange with a fastening device to fix the DPF canister relative to the DPF receptacle and the bulkhead, and to form a substantially airtight seal between the annular receptacle sealing flange and the annular canister sealing flange.

16. The method for installing the DPF canister of claim 15, comprising installing an annular gasket between the annular receptacle sealing flange and the annular canister sealing flange.

17. The method for installing the DPF canister of claim 15, comprising:
   removing an access door from an access opening through a wall of the aftertreatment module housing, wherein the access opening is disposed on the same one of the exhaust gas inlet side and the exhaust gas outlet side of the aftertreatment module housing as the annular receptacle sealing flange;
   inserting the DPF canister into the the aftertreatment module housing through the access opening; and
   replacing the access door on the access opening after the DPF canister is installed in the DPF receptacle.

18. The method for installing the DPF canister of claim 15, wherein the DPF canister comprises a second canister end flange attached at the second canister housing end and having a second canister end flange outer diameter that is less than the receptacle sealing flange inner diameter, the method for installing the DPF canister comprising inserting the second canister end flange through the annular receptacle sealing flange and into the receptacle housing until the annular canister sealing flange abuts the annular receptacle sealing flange.

19. The method for installing a DPF canister of claim 15, comprising:
   removing a befouled DPF canister from the DPF receptacle; and
   installing the DPF canister in place of the befouled DPF canister.

* * * * *